United States Patent [19]
Saleman

[11] Patent Number: 5,329,724
[45] Date of Patent: * Jul. 19, 1994

[54] RODENT TRAP

[76] Inventor: Walter M. Saleman, 840 The Rialto, Venice, Fla. 34285

[*] Notice: The portion of the term of this patent subsequent to Aug. 17, 2010 has been disclaimed.

[21] Appl. No.: 38,172

[22] Filed: Mar. 29, 1993

Related U.S. Application Data

[63] Continuation-in-part of Ser. No. 9,269, Jan. 26, 1993, Pat. No. 5,235,799.

[51] Int. Cl.⁵ ............................................ A01M 23/22
[52] U.S. Cl. ............................................... 43/62
[58] Field of Search ................... 43/61, 62, 64, 65, 67, 43/121

[56] References Cited

U.S. PATENT DOCUMENTS

| | | | |
|---|---|---|---|
| 104,570 | 6/1870 | Fox | 43/62 |
| 106,858 | 8/1870 | Newton | 43/62 |
| 334,443 | 1/1886 | Kobelke | 43/62 |
| 336,998 | 3/1886 | Hauserman | 43/62 |
| 516,937 | 3/1894 | Leflet | 43/61 |
| 1,587,536 | 6/1926 | Lobit | 43/61 |
| 1,650,458 | 11/1927 | McDonald | 43/62 |
| 2,707,844 | 5/1955 | Ciolli | 43/62 |
| 3,008,261 | 11/1961 | Long | 43/62 |
| 5,024,021 | 6/1991 | Wang | 43/62 |

FOREIGN PATENT DOCUMENTS 0852301  9/1981  U.S.S.R. .................................. 43/62

*Primary Examiner*—Kurt C. Rowan
*Attorney, Agent, or Firm*—Charles J. Prescott

[57] ABSTRACT

A rodent trap structured for capturing one or more rodents as a piece of bait is being consumed within the trap. Slidably mating, telescopically extendable upper and lower inverted and upright cup-shaped members, respectively, define a closed interior volume into which a rodent may enter through an entrance hole formed through a side wall of the lower member when the upper member is held in an armed position above the bottom of the lower housing. To hold the upper member in the armed position, a slender elongated trip rod of one embodiment downwardly extends from a central point of the top of the upper member, to be supported on a rigid piece of bait held above the bottom between uniquely configured spaced bait posts. These bait posts are connected to and upwardly extend into the interior volume from the bottom of the lower member. When so supported by the trip rod on the rigid bait, the upper member will only drop by gravity from the armed position to a closed position after sufficient bait is consumed by rodent to allow the remaining bait portion to pass downward between the bait posts, closing the entrance holes and capturing all rodents within the device at that time. The trap is preferably transparent for viewing of captured prey before disposal and includes evenly spaced entrance holes facing in all directions.

20 Claims, 5 Drawing Sheets

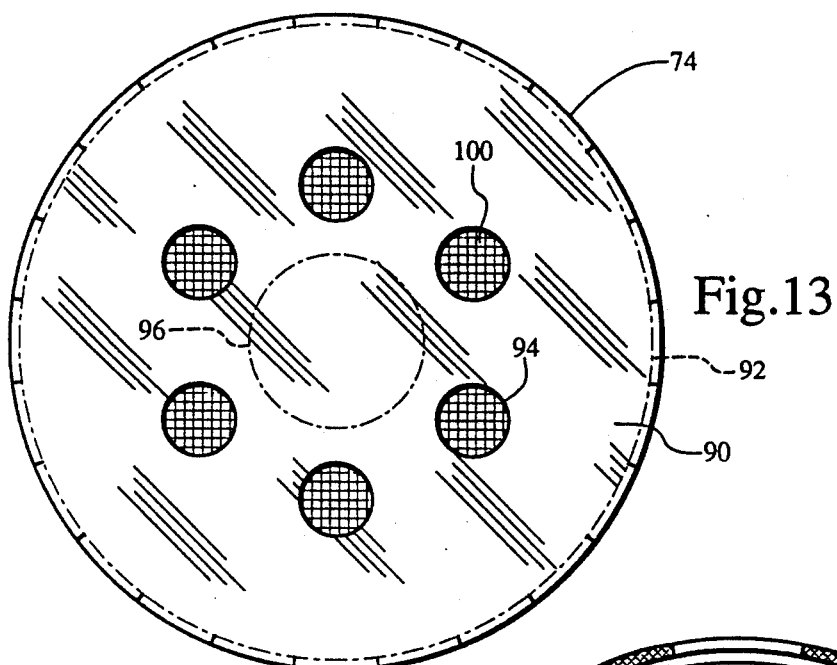
Fig.13
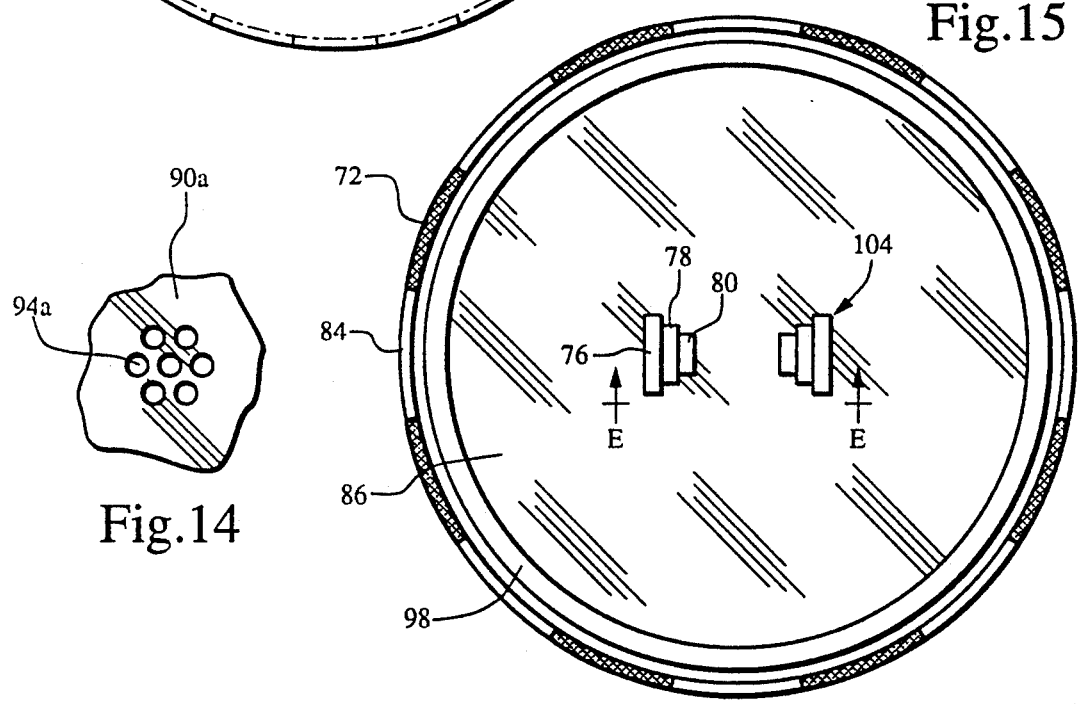
Fig.15
Fig.14
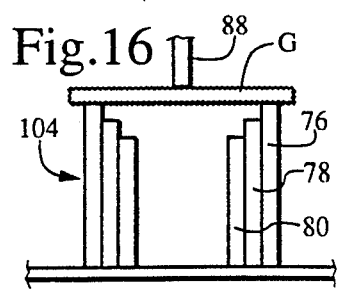
Fig.16
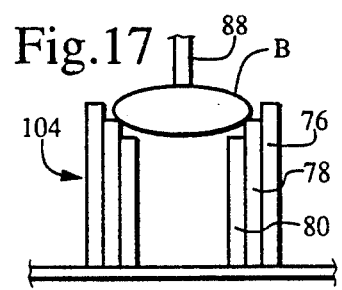
Fig.17
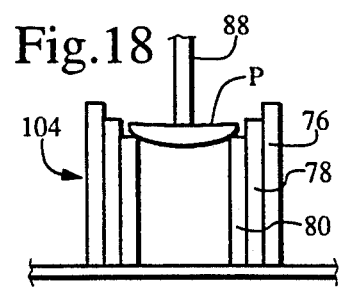
Fig.18

RODENT TRAP

This is a continuation in part of Ser. No. 08/009,269 filed Jan. 26, 1993 entitled a Roach or Rodent Trap, now U.S. Pat. No. 5,235,799.

BACKGROUND OF THE INVENTION

1. Scope of the Invention

This present invention relates generally to rodent traps, and more specifically to traps particularly suitable for capturing mice and other small rodents or roaches in a reusable container which may then be readily emptied without injury to the trapped rodent.

2. Prior Art

The art of animal trapping is well-known and many different trap designs have been invented in an attempt to provide a reliable and inexpensive device for capturing and removing small rodents from building interiors. Typical approaches to this problem involve the use of devices such as glue traps and spring traps.

Unfortunately, the use of such traps can be disadvantageous in a number of respects. Glue trap or "sticky trap" products attempt to entrap rodents onto a sticky surface, usually within a device such as a cardboard box with open ends. Small animals such as mice which get trapped in these devices will inevitably suffer terribly for hours or days and are often thrown into the trash while still alive and stuck to the adhesive.

Common wood base spring traps are designed to instantly kill rodents while the rodent attempts to remove bait from a spring loaded trip pad mechanism. These devices, however, can be excessively cruel and inhumane, especially when they fail to function as desired. Moreover, the risk of injury is especially high to young children or household pets.

These are some of the reasons why there is a further need for a simple and low cost rodent trap that is at least as inexpensive as the aforementioned conventional products but does not present the noted disadvantages. I have previously invented a non-hazardous trap a disclosed in U.S. Pat. No. 5,148,625 which teaches a device similar to that of the present invention, relying upon a piece of consumable bait to support a closable hinged door mechanism. A number of other prior art devices are also known to applicant for trapping rodents as follows:

| | |
|---|---|
| Knights | 1,186,406 |
| Deane | 2,736,984 |
| Muelling | 4,232,472 |
| Broman | 4,462,181 |
| Straver | 4,682,441 |
| Ha | 4,829,700 |
| Lindros | 5,005,313 |

The present invention, similar to my '625 patent, is provided to entrap a number of rodents therewithin which are consuming a piece of bait. As the bait is consumed by the rodent(s) and reaches a certain reduced size, the upper inverted cup-shaped member is automatically released to fall to a closed position. The bait utilized may be a peanut half because of its size and structure and the attractiveness of the peanut odor as food for rodents. Other bait shapes are also disclosed.

BRIEF SUMMARY OF THE INVENTION

This invention is directed to a rodent trap structured for capturing one or more rodents as a piece of bait is being consumed within the trap. Slidably mating, telescopically extendable upper and lower inverted and upright cup-shaped members, respectively, define a closed interior volume into which a rodent may enter through one of a plurality of entrance holes formed through a side wall of the lower member when the upper member is held in an armed position above the bottom of the lower housing. To hold the upper member in the armed position, a slender elongated trip rod of one embodiment downwardly extends from a central point of the top of the upper member, to be supported on a rigid piece of bait held above the bottom between uniquely configured spaced bait posts. These bait posts are connected to and upwardly extend into the interior volume from the bottom of the lower member. When so supported by the trip rod on the rigid bait, the upper member will only drop by gravity from the armed position to a closed position after sufficient bait is consumed by rodent(s) to allow the remaining bait portion and the upper member to fall downward between the bait posts, closing the entrance holes and capturing all rodents within the device at that time. The trap is preferably transparent for viewing of captured prey before disposal and includes evenly spaced entrance holes facing in all directions.

It is therefore an object of this invention to provide an easily armable rodent trap which utilizes gravity to close and capture rodents lured thereinto.

It is yet another object of this invention to provide a rodent trap which includes entrance holes facing in all directions to facilitate bait aroma disbursement and ease of rodent entry.

It is yet another object of this invention to provide a more humane means of eliminating small rodents from building interiors.

It is yet another object of this invention to provide a resuable rodent trap which may capture a plurality of rodents therewithin for disposal.

It is yet another object of this invention to provide a rodent trap preferably utilizing common household food such as crackers, cookies, nuts, straight pretzels or potato sticks or the like as bait which, when partially consumed, will then trigger the closing of the lid to capture rodents contained therewithin.

It is yet another object of this invention to provide a rodent trap that may simply be turned upside down to empty the contents without having to operate any mechanisms or latching systems.

It is yet another object of this invention to preferably provide a transparent rodent trap which facilitates viewing of the contents trapped therewithin.

It is yet another object of this invention to provide a rodent trap which is easily washable and of sufficiently small size so as to be placed in tight quarters within the building where rodents normally travel to seek food.

In accordance with these and other objects which will become apparent hereinafter, the instant invention will now be described with reference to the accompanying drawings.

BRIEF DESCRIPTION OF THE DRAWINGS

FIG. 13 is a top plan view of the upper member of FIG. 10.

FIG. 14 is a partial top plan view of the upper member of FIG. 10 showing an alternate vent aperture arrangement.

FIG. 15 is a top plan view of the lower member of FIG. 10 with the upper member removed therefrom.

FIG. 16 is a side elevation view of the bait posts in the direction of arrows E—E in FIG. 15 showing the piece of bait as a flat cracker or the like.

FIG. 17 is a side elevation view of the bait posts in the direction of arrows E—E in FIG. 15 showing the piece of bait as a flat cracker or the like showing the embodiment of the rigid piece of bait as in FIG. 7.

FIG. 18 is a side elevation view of the bait posts in the direction of arrows E—E in FIG. 15 showing the piece of bait as a flat cracker or the like showing the bait as a half of a peanut.

DETAILED DESCRIPTION OF THE INVENTION

Figure 2:
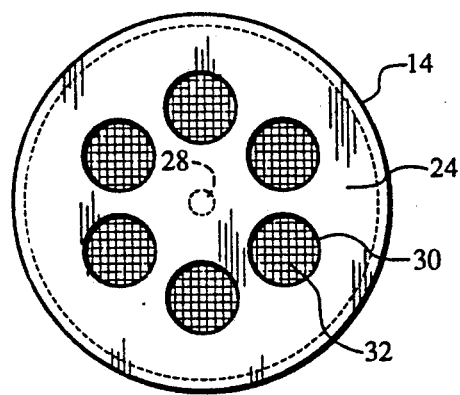
FIG. 2 is a top plan view of the upper member of FIG. 1.
Figure 1:
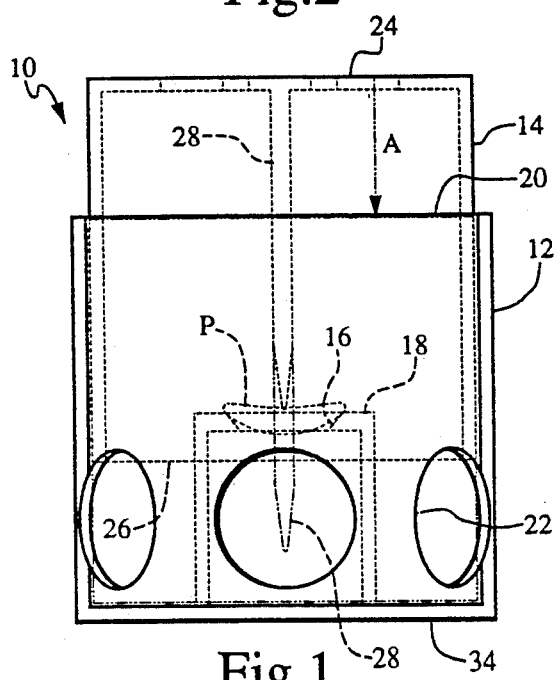
FIG. 1 is a side elevation view of one embodiment of the invention in its armed position.
Figure 3:
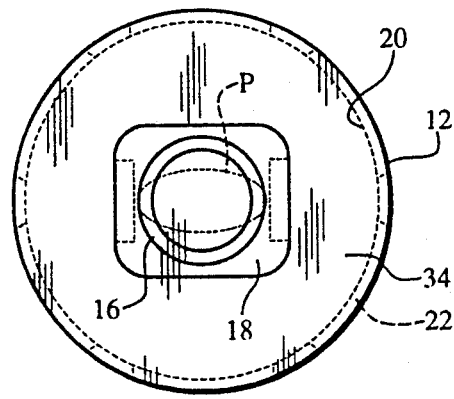
FIG. 3 is a top plan view of the lower member of FIG. 1 with the upper member removed.

Referring now to the drawings, and particularly to FIGS. 1 to 3, one embodiment of the invention is there shown at numeral 10 and includes a lower cup-shaped member 12 and an upper cup-shaped member 14, both fabricated of thin-wall molded plastic material. The lower member 12 includes cylindrical side walls which upwardly extend from a flat bottom 34 to define an open upper end 20 thereof. The upper member 14 also includes circular upright side walls extending downwardly from a flat top 24 to an open lower end 26 thereof.

Upper member 14 is sized to freely slidably translate up and down in telescopic fashion within the lower member 12. When the upper and lower members 14 and 12 are slidably interengaged as shown in FIG. 1, they define an interior volume.

Connected and upwardly extending into the interior volume from bottom 34 is a bait table 18 having a horizontal bait aperture 16 formed centrally thereon. The bait aperture 16 has tapered margins as shown in FIG. 1 so as to supportively receive a piece of rigid bait such as a peanut half P supported therewithin. The lower member 12 also includes one or more prey entrance holes 22 formed immediately adjacent the bottom 34 so that when the device 10 is armed, a rodent may freely enter into the interior bottom therethrough. The upper member 14 includes a centrally positioned upright trip rod 28 which is sized in length somewhat shorter than the overall height of the upper member 14 so that the free lower distal end of the trip rod 28 will come in contact against the bait P and support the upper member 14 so that its lower opening 26 is positioned above the bottom 34. In this armed configuration, the holes 22 are opened, allowing prey to enter into the interior volume of the device 10.

After the prey enters into the interior volume of the device 10, consumption of the bait P is likely to commence. When the bait P has been sufficiently consumed, it will pass downwardly through the bait aperture 16, allowing trip rod 28 and the connected upper member 14 to fall downwardly in the direction of arrow A to a closed position wherein the lower opening 26 rests against bottom 34, thus closing off holes 22. Because this sequence of events is sufficiently instantaneous, all prey are trapped within the device 10.

To further assist in dispersion of the bait odor from a baited trap and to sustain the lives of trapped animals, one or more ventilation apertures 30 having screen or mesh 32 are also provided. These apertures 30 assist also in the rapid closure of the trap by more quickly allowing air within the interior volume to escape.

Figure 5:
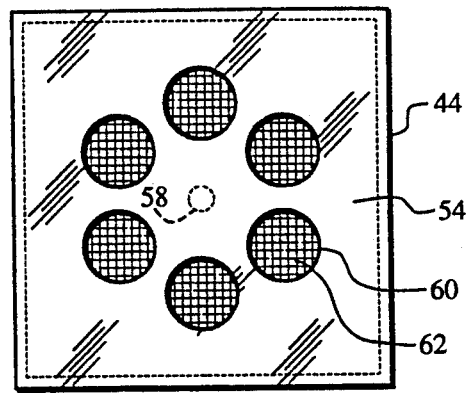
FIG. 5 is a top plan view of the upper member of the invention shown in FIG. 4.
Figure 4:
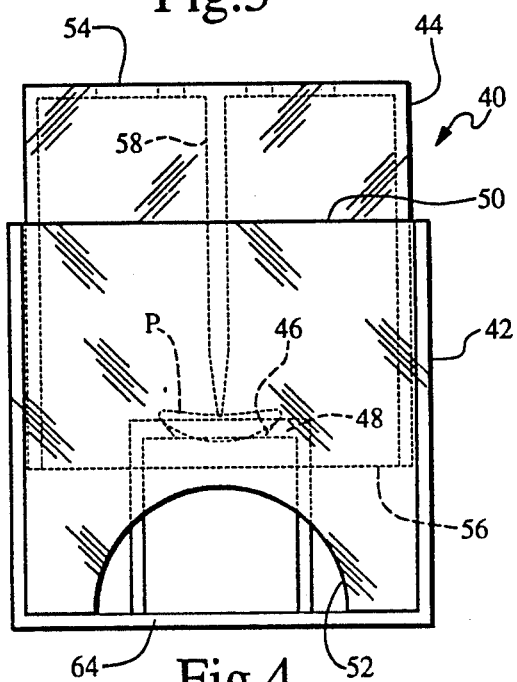
FIG. 4 is a side elevation view of another embodiment of the invention.
Figure 6:
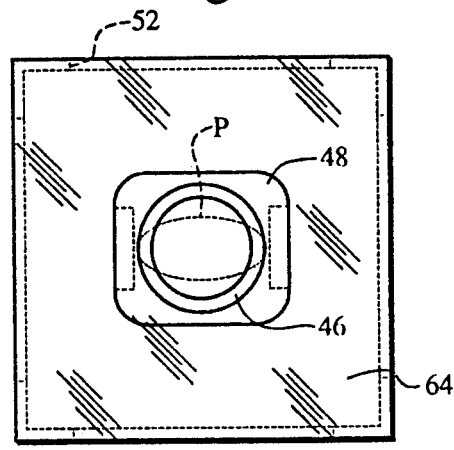
FIG. 6 is a top plan view of the lower member of the invention shown in FIG. 4 with the upper member removed.

Referring now to FIGS. 4, 5 and 6, another embodiment of the invention is shown generally at numeral 40 and is generally structured similarly to that previously described. However, in this embodiment, the lower and upper members 42 and 44 are molded of transparent thin-wall plastic to facilitate inspection of the trapped prey contained within the device. In this embodiment 40, the lower member 42 includes a bait table 48 having a bait aperture 46 formed therein connected to the bottom 64 as previously described. The upright side walls of the lower member 42 include entrance holes 52 formed into all of the side wall surfaces which upwardly extend from the bottom 64.

The upper member 44 includes a trip rod 58 which downwardly extends from a central point of a top 54, the trip rod 58 being somewhat shorter than the overall height of the upper member 44 so that the lower distal end of the trip rod 58 will support the upper member 44 resting atop a piece of bait P in an armed position as previously described. In this armed configuration, a rodent may enter through the arched hole 52 into the interior volume to consume the bait P.

Again, the humane user prefers to have ventilation apertures 60 covered by mesh 62 in place within top 54 so as to allow the captured critters to remain alive until properly disposed of.

Figure 7:
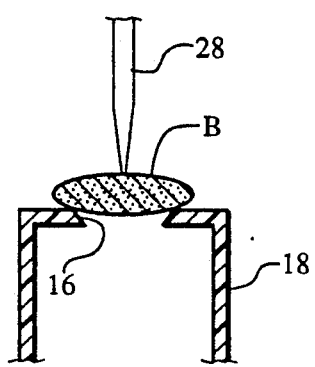
FIG. 7 is a partial cross section view of the bait table of either FIGS. 1 or 4 showing an alternate embodiment of a rigid piece of bait.
Figure 8:
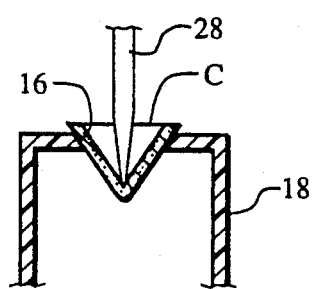
FIG. 8 is a partial cross section view of the bait table of either FIGS. 1 or 4 showing another alternate embodiment of a rigid piece of bait.
Figure 9:
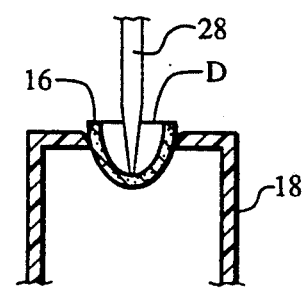
FIG. 9 is a partial cross section view of the bait table of either FIGS. 1 or 4 showing yet another alternate embodiment of a rigid piece of bait.

Referring to FIGS. 7, 8 and 9, alternate embodiments of formed rigid bait B, C, and D positioned atop the bait table 18 within bait aperture 16 as shown in FIG. 1 are described. Each of the formed baits B, C, and D are made of rigidly connected food particles having a suitable scent and flavor for attracting the appropriate prey. Bait B is ellipsoidal, while bait C is generally conically shaped having a V-shaped cross section, while bait D has a generally U-shaped cross section, all of which will support the distal lower end of trip rod 28 as shown.

While the embodiments 10 and 40 of the invention are formed of opaque or transparent molded plastic material, respectively, the device may be fabricated of plastic panels adhered at their joints having translucent panels as well.

Referring now to FIGS. 10 to 15, another embodiment of the invention is shown generally at numeral 70 and includes a lower cup-shaped member 72 and an upper inverted cup-shaped member 74, both fabricated of thin wall molded transparent plastic material. The lower member 72 includes cylindrical upright side walls which upwardly extend from a flat bottom 86 to define an open upper end 82 thereof. The upper member 74 also includes circular upright side walls extending downwardly from a flat top 90 to an open lower end 102 thereof.

The upper member 74 is sized to be self-aligning and freely slidably translatable up and down in telescopic fashion within the lower member 72. When so engaged, the upper and lower members 74 and 72 define an interior volume.

Connected and upwardly extending into the interior volume from bottom 86 are two opposing spaced apart bait posts 104. Each bait post 104 is defined by a plurality of side-by-side flat plates 76, 78, and 80 of descending height and width and arranged in opposing fashion so that the shortest and narrowest flat plates 80 of each bait post 104 face one another as shown. By this arrangement, the descending upper ends of each of the flat plates 76, 78 and 80 cooperate to define successively narrower and lower horizontal planes for receiving various sized consumable bait shown typically at G such as crackers, potato chips or the like.

The lower member 72 also includes a plurality of evenly spaced entrance holes 84 formed immediately adjacent the bottom 86 so that, when the device 70 is armed, a rodent may freely enter into the interior volume.

Figure 10:
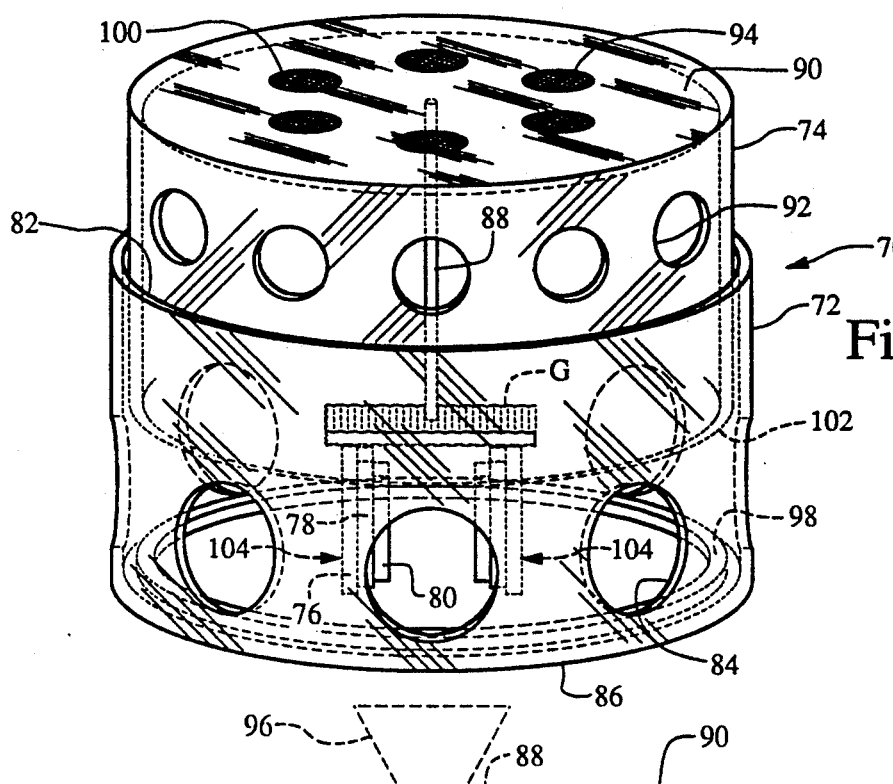
FIG. 10 is a perspective view of still another embodiment of the invention in its armed position.
Figure 11:
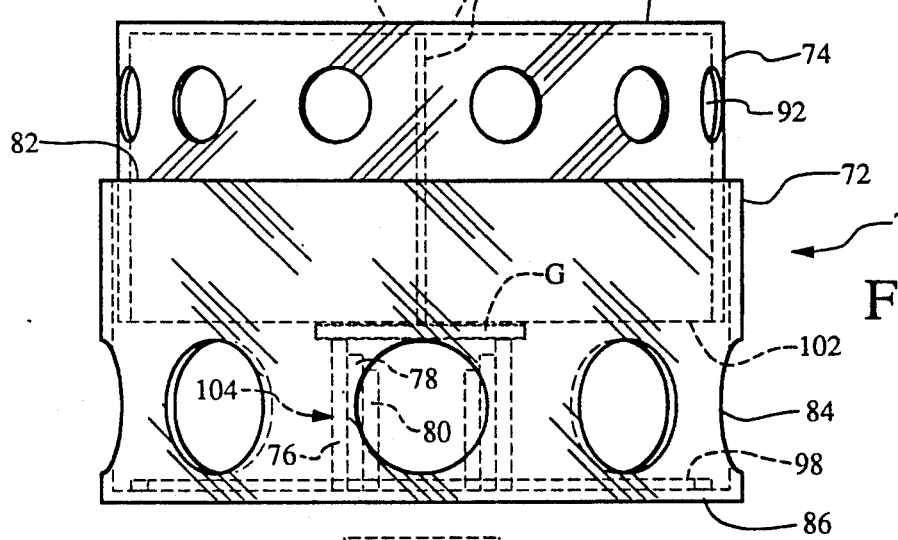
FIG. 11 is a side elevation view of FIG. 10.

The upper member 74 includes a centrally positioned rigid upright trip rod 88 which is sized in length somewhat shorter than the overall height of the upper member 74 so that the free lower distal end of the trip rod 88 will come in contact against the bait G and support the upper member 74 in its armed position shown in FIGS. 10 and 11. In this armed position, the entrance holes 84 are opened, allowing prey to enter into the interior volume of the device 70.

After the prey enters into the interior volume, consumption of the bait G is likely to commence. When the bait G has been sufficiently consumed, it will break apart and fall downwardly between the bait posts 104, allowing the trip rod 88 and the connected upper member 74 to fall by gravity downwardly into their closed position shown in FIG. 12 wherein the lower opening 102 rests against bottom 86 and the entrance holes 84 are closed. Because this sequence of events occurs quite rapidly, prey are trapped within the device 70.

To assist in the dispersion of bait odor from a baited trap 70 and to sustain the lives of trapped animals subsequently captured therewithin, a plurality of ventilation apertures 94 formed into top 90 having a screen or mesh 100 are also provided. These aperture 94 assist in more rapidly allowing the trap to close by more quickly allowing the air within the interior volume to escape as the device 70 falls from its armed to its closed position.

FIG. 14 depicts an alternate to the screened ventilation holes 94 of FIG. 10. A plurality of clusters of small holes 94a within the top 90a are easily molded into the top 90a to accomplish the same ventilation purpose while preventing any prey from escaping from the interior volume.

To further assist in the dispersion of bait odor, additional ventilation apertures 92 are also provided evenly spaced around the upright side walls of the upper member 74. These additional apertures 92 greatly enhance the dispersion of bait odor to attract prey.

Figure 12:
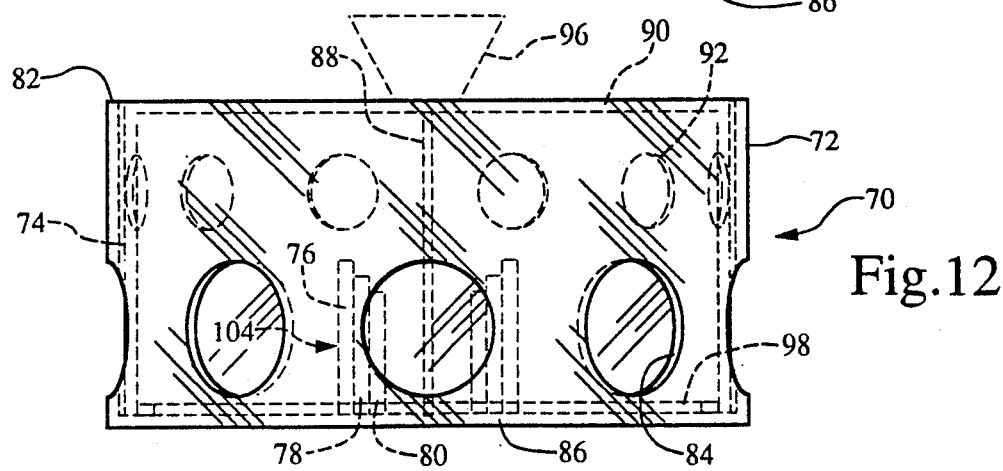
FIG. 12 is a side elevation view of FIG. 10 in its closed position.

To further insure that prey captured within the device when upper member 74 falls to its closed position in FIG. 12 and remains closed, an annular ring 98 connected to the upper surface of the bottom 86 is also provided. This annular ring 98 closely aligns within the open lower end 102 to prevent a clever rodent from maneuvering between the bottom 86 and the lower open end 102 and then manually raising the upper member 74 to effect escape.

A handle 96 is optionally provided to facilitate more easy manipulation arming of the device and dispensing of captured critters. This embodiment 70 is also fabricated of transparent plastic so as to facilitate observation of the prey captured therewithin and also to further entice prey to enter thereinto. It has been learned that the transparency not only provides visual eye contact of the bait by the prey, but also is less intimidating to cautious prey.

Referring further to FIGS. 16, 17 and 18, the uniquely structured bait posts 104 are there shown. A large cracker, potato chip or the like G will easily rest upon the tallest and furthest apart flat plates 76 shown in FIG. 16. A rigid formed piece of bait B will easily be supported between the intermediate plates 78 shown in FIG. 17, while the closest spaced and shortest plate 80 will easily support a peanut half P or the like. In FIG. 15, the narrowing of the width of the successively shorter flat plates 76, 78 and 80 further allows the prey to more easily have access to the variable sized pieces of bait and so as to be less intimidating and less likely to spook the prey out of the trap before it is triggered to a closed position.

Although this embodiment 70 is particularly suitable for capturing rodents because of the ability to support larger sizes of bait, nonetheless, all embodiments of this invention may be downsized so as to function equally well in capturing roaches.

Figure 19:
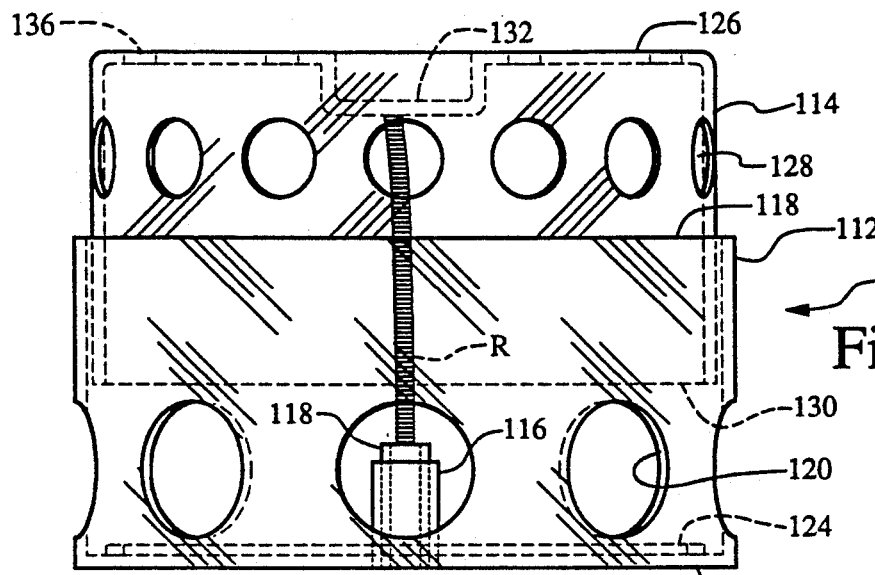
FIG. 19 is a side elevation view of yet another embodiment of the invention in its armed position.
Figure 20:
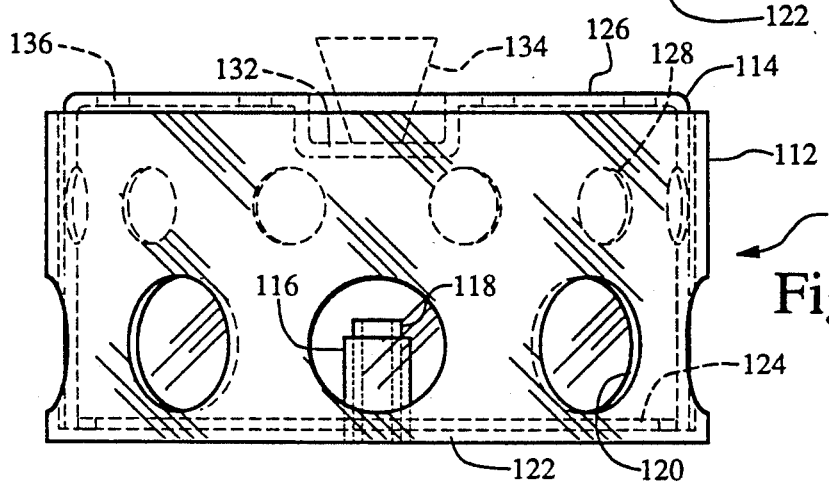
FIG. 20 is a side elevation view of FIG. 19 in its closed position.
Figure 21:
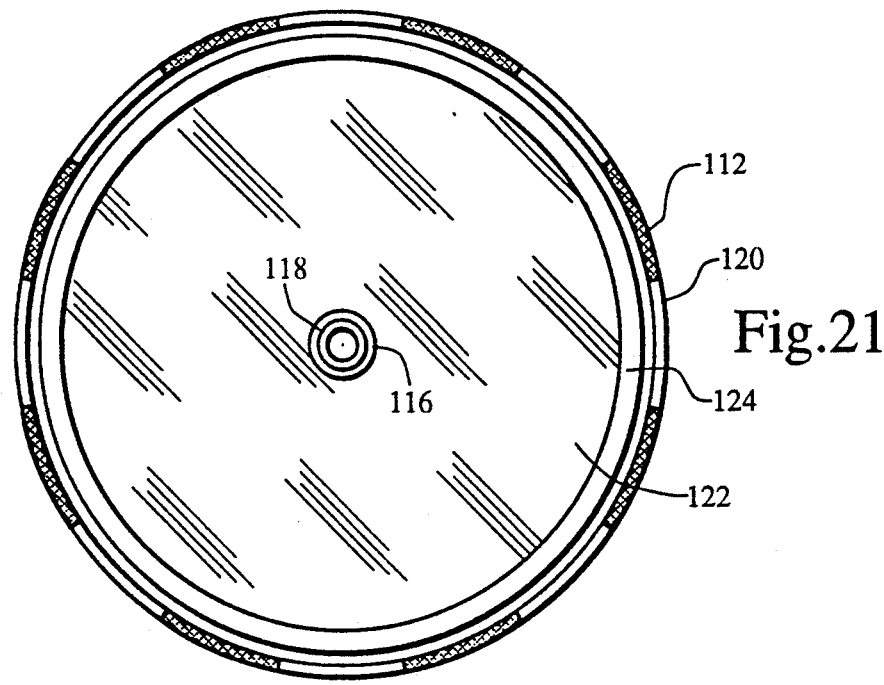
FIG. 21 is a top plan view of the lower member of FIG. 19 with the upper member removed therefrom.

Referring lastly to FIGS. 19, 20 and 21, yet another embodiment of the invention is shown generally at numeral 110 and includes a lower cup-shaped member 112 and an upper inverted cup-shaped member 114, both fabricated of thin wall transparent molded plastic material. The lower member 112 includes cylindrical upright walls which upwardly extend from a flat bottom 122 to define an open upper end 118 thereof. The upper member 114 also includes circular upright side walls extending downwardly from a flat top 126 to an open lower end 130 thereof.

Upper member 114 is sized to be self-aligning with and to be freely slidably translatable up and down within the lower member 112. When the upper and lower members 114 and 112 are slidably interengaged as shown in FIGS. 19 and 20, they define an interior volume.

Connected and upwardly extending into the interior volume from bottom 122 is a primary bait tube 116 having an upright central bait support hole longitudinally therethrough. A removable secondary bait tube 118 is also provided which slidably fits within the primary bait tube 116 as shown.

Both the primary bait tube 116 and the secondary bait tube 118 are each provided to receive an appropriately sized elongated, generally straight and slender piece of consumable bait R such as a pretzel or a specially prepared piece of bait formed of aromatically alluring consumable food. The lower end of the bait rod or stick R is thus insertable into one of the bait tubes 116 or 118 (depending upon thickness) and upwardly extends therefrom a distance sufficient so as to supportably engage against a centrally positioned cavity or depression 132 formed into the top 126 as shown. Thus, the upper distal end of the bait rod R will contact against the bottom surface of cavity 132 and support the upper member 114 in an armed position above the bottom 122 as seen in FIG. 19.

The upper member 114 also includes a plurality of apertures 128 formed evenly spaced around the side walls thereof. These apertures 128 serve to facilitate dispersion of the aroma of the bait R so as to more effectively lure prey into the device 110.

As previously described, the lower member 112 also includes a plurality of evenly spaced prey entrance holes 120 formed immediately adjacent the bottom 122 so that, when the device 110 is armed as shown in FIG. 19, one or more rodents may freely enter into the interior volume therethrough.

To further assist in the dispersion of the bait odor from the baited trap 110 and to sustain the lives of trapped animals, one or more ventilation apertures 136, again either screen or mesh covered so as to prevent prey escape, are also provided. These apertures 136 further assist in the rapid closure of the trap by more quickly allowing the air within the interior volume to escape as the trap falls from its armed to its closed position.

Again, a handle 134 is optional as is an annular ring 124 connected to the bottom 122 and extending upwardly into the interior volume. This annular ring 124 is sized to closely align within the open lower end 130 so as to assist in preventing escape of prey trapped within the device 110 as previously described.

While the instant invention has been shown and described herein in what are conceived to be the most practical and preferred embodiments, it is recognized that departures may be made therefrom within the scope of the invention, which is therefore not to be limited to the details disclosed herein, but is to be afforded the full scope of the claims so as to embrace any and all equivalent apparatus and articles.

What is claimed is:

1. A rodent trap for capture, confinement, and disposal of one or more rodents comprising:

a lower member having a continuous upright side wall and a closed bottom which define an interior volume, said lower member side wall upwardly extending to define an open upper end of said lower member;

two opposing spaced apart bait posts positioned centrally atop said bottom, said bait posts defining a plurality of generally horizontal, vertically spaced bait support planes formed therebetween spaced above said bottom and structured to support a rigid piece of bait of various sizes such as a cracker and a peanut whereby the bait may be supported between said bait posts along one said bait support plane;

at least on entrance hole formed through said lower member side wall sized and positioned relative to said bottom to permit a rodent to freely pass through said entrance hole into said interior volume;

an upper member separate from said lower member and having an upright continuous side wall and a top, said upper member side wall downwardly extending to define an open lower end of said upper member;

said upper member sized to freely slide vertically within said lower member, said upper member side wall closing off said entrance hole when said upper member is in a downward closed position resting atop said bottom;

an upright trip rod connected at an upper end thereof to and downwardly extending from a central point of said top, a free distal lower end of said trip rod aligned between said bait posts when said upper member is engaged within said lower member;

said trip rod distal end being supported against the bait and, supporting said upper member in an armed position above said bottom a vertical distance sufficient for the rodent to enter into said interior volume through said aperture;

said upper member falling by gravity to said closed position when the rodent consumes a sufficient portion of the bait to allow said trip rod to pass downwardly between said bait posts.

2. A rodent trap as set forth in claim 1, wherein:
    said upper and lower members are transparent.

3. A rodent trap as set forth in claim 2, wherein:
    said top includes a ventilation aperture for allowing air to pass therethrough, yet preventing the rodent from passing therethrough.

4. A rodent trap as set forth in claim 1, wherein:
    each said bait post is defined by a plurality of side-by-side connected flat upright plates, each plate of said plurality of plates successively shorter in height from said bottom and narrower in width, a shortest and narrowest plate of each said bait post facing one another;

5. A rodent trap as set forth in claim 1, wherein:
    said upper member side wall includes a plurality of evenly spaced additional ventilation apertures formed therethrough for allowing additional air passage through said interior volume for enhanced distribution of bait aroma.

6. A rodent trap as set forth in claim 1, wherein:
    an annular ring connected to an upper interior surface of said bottom;
    said annular ring sized to closely mate within said open lower end of said upper member when said upper member is in said closed position.

7. A rodent trap for confinement and disposal of a rodent comprising:

an upper and a lower thin-wall cup-shaped member each having upright side walls and a closed top and a closed bottom, respectively;

said upper member having an open lower end and said lower member having an open upper end, said upper and lower members freely telescoping one to another and defining an interior volume sized to receive a rodent therewithin;

two opposing spaced apart bait posts positioned centrally atop said bottom, said bait posts defining a plurality of generally horizontal, vertically spaced bait support planes formed therebetween spaced above said bottom and structured to support a rigid piece of bait of various sizes such as a cracker and a peanut whereby the bait may be supported between said bait posts along one said bait support plane;

at least one entrance hole formed through one said lower member side wall and sized and positioned relative to said bottom to permit the rodent to freely pass through said entrance hole into said interior volume;

an upright trip rod connected at an upper end thereof to, and downwardly extending from, a central point of said top, a free distal end of said trip rod aligned between said bait posts;

said trip rod distal end extending below one said bait support plane when said upper and lower members are in a closed position wherein said upper member lower open end is resting atop said bottom;

said upper member side wall closing off said entrance hole when said upper and lower members are in the closed position.

8. A rodent trap as set forth in claim 7, wherein:
said upper and lower members are transparent.

9. A rodent trap as set forth in claim 8, wherein:
said top includes a ventilation aperture for allowing air to pass therethrough, yet preventing the rodent to pass therethrough.

10. A rodent trap as set forth in claim 7, further comprising:
each said bait post is defined by a plurality of side-by-side connected flat upright plates, each plate of said plurality of plates successively shorter in height from said bottom and narrower in width, a shortest and narrowest plate of each said bait post facing one another;

11. A rodent trap as set forth in claim 7, further comprising:
said upper member side wall includes a plurality of evenly spaced additional ventilation apertures formed therethrough for allowing additional air passage through said interior volume for enhanced distribution of bait aroma.

12. A rodent trap as set forth in claim 7, further comprising:
an annular ring connected to an upper interior surface of said bottom;
said annular ring sized to closely mate within said open lower end of said upper member when said upper member is in said closed position.

13. A rodent trap for capture, confinement and disposal of one or more rodents comprising:
a lower member having an upright side wall and a closed bottom which define an interior volume, said lower member side wall upwardly extending to define an open upper end of said lower member;

a bait tube connected and positioned centrally atop said bottom, said bait tube having an upright bait support hole formed therethrough to support a rigid, slender elongated piece of bait such as a pretzel stick whereby a lower end of the bait may be inserted into said bait support hole and upwardly extending therefrom;

at least one entrance hole formed through said lower member side wall sized and positioned relative to said bottom to permit a rodent to freely pass through said entrance hole into said interior volume;

an upper member separate from said lower member and having an upright side wall and a top, said upper member side wall downwardly extending to define an open lower end of said upper member;

said upper member sized to freely slide vertically within such lower member, said upper member side wall closing off said entrance hole when said upper member is in a downward closed position resting atop said bottom;

said upper member being supported by the bait in an armed position above said bottom a vertical distance sufficient for the rodent to enter into said interior volume through said aperture;

said upper member falling by gravity to said closed position when the rodent consumes the bait sufficiently to cause a fracture of the bait.

14. A rodent trap as set forth in claim 13, wherein:
said upper and lower housings are transparent.

15. A rodent trap as set forth in claim 14, wherein:
said top includes a ventilation aperture for allowing air to pass therethrough, yet preventing the rodent from passing therethrough.

16. A rodent trap as set forth in claim 13, wherein:
said upper member side wall includes a plurality of evenly spaced additional ventilation apertures formed therethrough for allowing additional air passage through said interior volume for enhanced distribution of bait aroma.

17. A rodent trap for capture, confinement and disposal of a rodent comprising:
an upper and a lower thin-wall cup-shaped member each having upright side walls and a closed top and a closed bottom, respectively;

said upper member having an open lower end and said lower member having an open upper end, said upper and lower members freely telescoping one to another and defining an interior volume sized to receive a rodent therewithin;

at least one entrance hole formed through one said lower member side wall and sized and positioned relative to said bottom to permit the rodent to freely pass through said entrance hole into said interior volume;

a bait positionable between said top and said bottom, said bait supporting said upper member in an armed position wherein said upper member lower open end is spaced above said bottom a distance sufficient to allow a rodent to enter into said interior volume through said aperture;

said upper member falling by gravity to a closed position wherein said upper member lower open end is resting atop said bottom when a portion of said bait is consumed by the rodent;

said upper member side wall closing off said entrance hole when said upper and lower members are in the closed position.

18. A rodent trap as set forth in claim 17, wherein:
said upper and lower members are transparent.

19. A rodent trap as set forth in claim 18, wherein:
said top includes a ventilation aperture for allowing air to pass therethrough, yet preventing the rodent to pass therethrough.

20. A rodent trap as set forth in claim 17, wherein:
said upper member side wall includes a plurality of evenly spaced additional ventilation apertures formed therethrough for allowing additional air passage through said interior volume for enhanced distribution of bait aroma.

* * * * *